United States Patent [19]

Rosenkranz et al.

[11] 3,928,299

[45] Dec. 23, 1975

[54] POLYMERS WHICH CONTAIN URETHANE GROUPS AND WHICH ARE CROSS-LINKABLE BY VINYL POLYMERISATION

[75] Inventors: Hans Jürgen Rosenkranz, Krefeld; Hans Rudolph, Krefeld-Bockum; Erich Wolff, Leichlingen; Harald von Rintelen, Leverkusen, all of Germany

[73] Assignee: Bayer Aktiengesellschaft, Germany

[22] Filed: Sept. 13, 1973

[21] Appl. No.: 397,161

Related U.S. Application Data

[63] Continuation-in-part of Ser. No. 247,758, April 26, 1972, abandoned.

[30] Foreign Application Priority Data

Apr. 30, 1971 Germany............................ 2121252

[52] U.S. Cl................... 260/89.5 N; 96/33; 96/35.1; 96/36.2; 96/115 R; 96/115 P; 117/124; 117/132; 117/138.8; 117/145; 117/155; 117/161; 161/203; 161/208; 161/216; 161/250; 161/252; 161/265; 204/159.14; 260/2 XA; 260/22 CB; 260/31.2 N; 260/33.4 UR; 260/33.6 UB; 260/33.8 UB; 260/47 UA; 260/75 NM; 260/77.5 CR; 260/78.4 R; 260/79.3 M; 260/86.1 N; 260/91.1 S; 260/91.3 R

[51] Int. Cl.².......................................... C08G 22/04

[58] Field of Search... 260/89.5 N, 86.1 N, 91.3 VA

[56] References Cited

UNITED STATES PATENTS

| | | | |
|---|---|---|---|
| 2,718,516 | 9/1955 | Bortnick | 260/86.1 N |
| 2,768,154 | 10/1956 | Unruh et al. | 260/91.3 VA |
| 2,887,469 | 5/1959 | Unruh et al. | 260/91.3 VA |

*Primary Examiner*—Harry Wong, Jr.
*Attorney, Agent, or Firm*—Connolly and Hutz

[57] ABSTRACT

Polymers which contain urethane groups and cross-linkable vinyl or vinylidene groups are suitable as photocrosslinking layers and molded products which are free from tackiness and do not show any friability in the presence of atmospheric oxygen.

1 Claim, No Drawings

POLYMERS WHICH CONTAIN URETHANE GROUPS AND WHICH ARE CROSS-LINKABLE BY VINYL POLYMERISATION

CROSS-REFERENCE TO RELATED APPLICATION

This application is a continuation-in-part of our application Ser. No. 247,758, filed Apr. 26, 1972, now abandoned.

This invention relates to polymers which contain urethane groups and which are cross-linkable by vinyl or vinylidene polymerization.

Numerous polymer systems are known which are hardened by the action of light, thus being converted into insoluble cross-linked materials. Such systems are used mainly in reproduction work, for example for the production of relief printing plates, printed circuits and stereotype printing blocks. Generally it is possible to distinguish between two different types of these polymers that are cross-linked by light. Polymers of the first types are those in which each primary step released leads to only one cross-linking position. Polycinnamic acid esters and polymers that can be cross-linked by photo-labile diazides are of this type. These systems are generally less sensitive to oxygen. The second type of polymer that can be hardened by the action of light contains vinyl or vinylidene groups and is cross-linked via these vinyl or vinylidene groups by addition polymerization, a few light quanta being sufficient to produce a large number of cross-linking positions. There is a constantly increasing demand for these systems in spite of their high sensitivity to oxygen because their sensitivity to light, including light in the visible range, is better by orders of magnitude than that of the first-mentioned type, especially if suitable sensitizers are used.

Apart form their sensitivity to atmospheric oxygen, the photopolymerization systems hitherto used are not free from disadvantages for reproduction purposes. In contrast to photopolymerizable mixtures used in the lacquer industry, which usuallyl include unsaturated polymers, such as unsaturated polyester, dissolved in vinyl or vinylidene monomers, photopolymerizable systems used for reproduction purposes must have a certain mechanical strength and be free from tackiness even before they are cross-linked. For this reason, mixtures of relatively high molecular weight polymers which have not been cross-linked and vinyl or vinylidene compounds with a high molecular weight, e.g. acrylic acid esters of polyhydric alcohols such as pentaerythritol or trimethylolpropane have hitherto been used in most cases. Layers obtained from these mixtures after photocross-linking, however, undergo considerable swelling and moreover unexposed coatings rapidly become brittle in the presence of atmospheric oxygen.

Another method of producing polymers which can be cross-linked by photopolymerization comprises binding the vinyl or vinylidene compounds directly to the polymer by suitable reactions. Such systems are very suitable for reproduction purposes but their preparation has previously entailed cetain difficulties. The reactions employed for their preparation in most cases require severe reaction conditions so that the addition of inhibitors such as hydroquinone and/or copper salts is necessary to prevent premature gelling of the reaction mixtures. These additives severely reduce the reactivity of the resulting products in the subsequent photo-cross-linking reaction.

The problem was, therefore, to find polymer systems capable of being cross-linked by vinyl or vinylidene polymerization and especially by vinyl or vinylidene polymerization released by light, which would not have the above mentioned disadvantages.

Until now it had not been possible to prepare polymers containing unsaturated copolymerizable side chains which can be cross-linked via a very fast light-initiated polymerization in order to obtain extremely high-cured coatings.

This invention now provides such an organic polymer containing per molecule at least two groups of the general formula:

$$CH_2{=}\overset{\displaystyle R}{\overset{|}{C}}-\overset{\displaystyle O}{\overset{\|}{C}}-O-(CH_2)_n-\overset{\displaystyle H}{\overset{|}{N}}-\overset{\displaystyle O}{\overset{\|}{C}}-O- \qquad I.$$

in which

R is a hydrogen atom or an alkyl group with 1 to 4 carbon atoms, preferably hydrogen or methyl; and

*n* is an integer from 1 to 6, preferably from 2 to 4; that means an organic polymer of the general formula $$(CH_2{=}\overset{\displaystyle R}{\overset{|}{C}}-\overset{\displaystyle O}{\overset{\|}{C}}-O-(CH_2)_n-NH-\overset{\displaystyle O}{\overset{\|}{C}}-O-)_yP \qquad Ia.$$

in which

R and n have the meanings given above, y denotes an integer from 2–500, preferably from 10–200 and P is the backbone of the claimed polymer, i.e. P is a hydroxyl group containing polymer as described below, reduced by these hydroxyl groups.

As may be seen from general formulae I and Ia, these polymers contain both urethane groups and free vinyl or vinylidene groups.

Polymers which contain the above-mentioned group of formula I from twice to 500 times, preferably from 10 to 200 times, having a number average molecular weight determined by the osmometric method of at least 1000, especially between 10,000 and 100,000 are preferred.

Polycondensates which contain active hydrogen are suitable, too, as hydroxyl group-containing polymers, especially those which contain alcoholic hydroxyl groups, for example polyesters of polybasic aliphatic or aromatic carboxylic acids with polyhydric alcohols, polyurethanes which contain hydroxyl groups or epoxy resins which contain hydroxyl groups.

It is preferred to use hydroxyl group-containing polymers obtained by the polymerization of hydroxyalkyl esters of acrylic acid or α-alkyl-substituted acrylic acids such as methylmethacrylic acid or by the copolymerization of these compounds with other vinyl or vinylidene compounds. Suitable hydroxyalkyl esters are the monoesters of the above mentioned acids with ethylene glycol, propylene glycol, propane-1,3-diol, butanediol, diethylene glycol and higher polyethylene glycols.

Synthetic high molecular weight compounds containing hydroxyl groups may be e.g. polyesters. The hydroxyl group-containing polyesters in question are reaction products of multivalent, preferably bivalent and if necessary additionally trivalent alcohols and multivalent, preferably bivalent carboxylic acids. Instead of the free carboxylic acids the corresponding acid anhydrides or the corresponding acid esters of low alcohols or mixtures thereof can be used, too. The carboxylic acids can be aliphatic, cycloaliphatic, aromatic and/or heterocyclic, and if necessary they can be substituted, e.g. by halogen atoms, and/or they can be unsaturated.

Any suitable polyesters may be used such as those prepared from polycarboxylic acids or acid anhydrides such as adipic acid, succinic acid, suberic acid, sebacic acid, azelaic acid, maleic acid (anhydride), phthalic acid (anhydride), isophthalic acid, therephthalic acid, tetrachlorophthalic acid (anhydride), hexahydrophthalic acid (anhydride), tetrahydrophthalic acid anhydride, endomethylene tetrahydrophthalic acid anhydride, hexachloroendomethylene tetrahydrophthalic acid, glutaric acid anhydride, fumaric acid, trimellitic acid, pyromellitic acid, dimeric and trimeric fatty acids such as oleic acid, if necessary in mixture with monomeric fatty acids, terephthalic acid dimethylester, terephthalic acid bis-glycolester and polyhydric alcohols such as ethylene glycol, propanediols, butanediols, hexanediols, octanediol-1.8, neopentyl glycol, cyclohexanedimethanol (= 1.4-bis-hydroxymethylcyclohexane), 2-methyl propandiol-1.3, 2.2.dimethyl-propanediol-1.3, diethylene glycol, di-β-hydroxyethylene butanediol, tripropylene glycol, xylylene glycol, glycerol, trimethylol propane, hexanetriol-1.2.6, butanetriol-1,2,4, trimethylol ethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, polybutylene glycols and their hydroxyalkylation products; those polyesters prepared of hydroxypivalic acid, thioglycollic acid, ω-hydroxydecanoic acid, caprolactone and diketene; those polyesters prepared of hydroxycarboxylic acids, e.g. ω-hydroxy caproic acid; those polyesters prepared of the above-mentioned dicarboxylic acids and polyphenols such as hydroquinone, 4,4'-dihydroxydiphenyl or bis-(4-hydroxyphenyl)-sulphone; polyesters modified with fatty acids ("oil alkyds") as well as saturated and unsaturated polyesters of naturally occurring acids and alcohols, their degradation products or ester interchange products with polyols, such as castor oil, tall oil, soy oil, linseed oil; polyesters of carbonic acid which are obtainable in known manner from hydroquinone, diphenylol propane, p-xylylene glycol, ethylene glycol, butanediol or hexanediol-1.6 and other diols by the usual condensation reactions, e.g. with phosgene, diethyl or diphenyl carbonate, or from cyclic carbonates such as glycol carbonate or vinylidene carbonate by polymerization; any suitable polyepoxide resins may be used such as the higher molecular resins which contain secondary hydroxyl groups and which are based on the bis-(2.3-epoxypropyl)-ether of 1.4-butanediol or diphenylol propane, those based on bis(2.3-epoxypropyl)-aniline and those based on N.N'-bis-(2.3-epoxypropyl)-N.N'-dimethyl-4.4'-diaminodiphenylmethane and modification products thereof with polyisocyanates, unsaturated carboxylic acids, natural resinic acids or with phenol-, melamine- and ureaformaldehyde resins; any suitable phenol-formaldehyde resins may be used such as those obtained by the usual methods, especially in the presence of excess formaldehyde, from phenol, cresols, xylenols, resorcinol or diphenylol alkanes by acid or alkaline condensation, and their cyanoethylation and hydrogenation products; any suitable polyurethanes must be used as those obtained from low molecular mono- or polyhydric alcohols such as ethylene glycol, propylene glycol, butanediol, hexane diol, diethylene glycol, triethylene glycol, thiodiglycol, N.N-di-(β-hydroxyethyl)-aniline or -m-toluidine, N-methyldiethanolamine, hydroquinone-di-(β-hydroxyethyl)-ether, adipic acid di-(β-hydroxyethyl)-ester, N.N.N'.N'-tetra(2-hydroxypropyl)-ethylene diamine, glycerol, trimethylol propane, mannitol or glucose by polyaddition to polyisocyanates such as hexamethylene diisocyanate, tetramethylene diisocyanate, toluylene diisocyanate, p-phenylene diisocyanate, 4.4'-diisocyanate diphenylmethane, 1.5-naphthylene diisocyanate, 4.4'.4''-triphenylmethane triisocyanate or 4.4'.4''-triisocyanate triphenyl thiophosphate; preferred high molecular weight compounds containing hydroxyl groups are homo- or copolymers of the following compounds: β-hydroxyethyl acrylate, β-hydroxypropyl acrylate, β-hydroxypropyl α-chloroacrylate, β-hydroxypropyl-α-phenyl acrylate, 2-hydroxy3-phenoxypropyl-α-ethyl acrylate, 2-hydroxy-3-chloropropyl methacrylate, 4-hydroxyphenyl methacrylate, 6-hydroxyhexyl methacrylate, 4-hydroxymethyl styrene, 2-aninoethyl methacrylate, methacrylic-2-hydroxyethyl acid amide, N-di-(β-hydroxyethyl)-methacrylic acid amide, acrylic acid 4-hydroxyphenylamide, acrylic acid 4-hydroxybutylamide, vinyl-2-hydroxyethyl ether, 4-(2-hydroxyethyl)-styrene, allyl alcohol, methacrylic acid trimethylol methylamide, maleic acid di-2-hydroxyethyl ester, 2-hydroxyethyl maleate, methyl-2-hydroxyethyl maleate, acrylic acid 3-di-(β-hydroxyethyl)-aminopropylamide, methacrylamide, acrylamide, acrylic acid hydrazide, N-hydroxymethacrylamide, acrylic acid, methacrylic acid, vinyl sulphonic acid, vinyl sulphonamide; most preferred high molecular weight compounds containing hydroxyl groups are, however, copolymers obtained from about 0.5–25 percent by weight, especially from about 5–10 percent by weight, of the above-mentioned monomers which are reactive with isocyanates and one or more of the following copolymerizable compounds: methyl, ethyl or butyl acrylate, methyl, ethyl, butyl or allyl methacrylate, styrene, α-methyl styrene, chlorinated styrenes, vinyl acetate, vinyl butyrate, vinyl chloride, vinylidene chloride, vinylbutyl ether, vinyl pyridine, N-vinylpyrrolidone, N-vinyloxazolidone, N-vinyl ureas, N-vinyl urethanes, ethylene, propylene, butadiene, isoprene, dimethylbutadiene, chloroprene, glycol diacrylates.

The hydroxyl group-containing polymer should advantageously have an average molecular weight of more than 1000, preferably between 10 000 and 100 000. The most suitable average molecular weight in any given case can easily be determined in a few tests. The optimum molecular weight range depends, of course, on the nature of the polymer.

The hydroxyl group-containing polymer is preferably dissolved in a solvent which does not react with isocyanate under the reaction conditions employed in this process, such as a hydrocarbon, halogenated hydrocarbon, ester, ketone or ether, and can be reacted with the unsaturated isocyanate with the aid of the usual catalysts which promote urethane formation, such as tertiary amines.

Vinyl monomers which contain isocyanate groups and are suitable for the process of preparing molded products and coatings according to the invention may be prepared by the method described in German Pat.

Specification No. 1 081 050. Isocyanatoethyl acrylate and isocyanatoethyl methacrylate are preferred. The polymers obtained by reacting hydroxyl-containing polymers with these substances according to the process of the invention provide particularly suitable coatings for reproduction purposes.

A preferred group of cross-linkable polymers Ia according to the invention is based on a polymeric hydroxyalkylacrylate, that means P represents a homo- or random copolymer reduced by y hydroxyl groups which contains per molecule y recurring units of the general formula

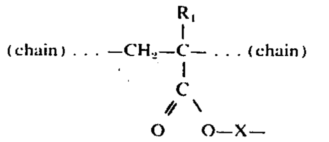
III wherein the urethane group is attached to X and $R_1$ represents hydrogen or alkyl with 1 to 4 C-atoms, preferably hydrogen or methyl, y denotes an integer from 2–500, preferably from 10–200, X represents a divalent aliphatic radical (1–9 C-atoms) the carbon chain of which may be branched or may contain one or two ether groups, such as ethylene, propylene, isopropylene, butylene and radicals of the formula $-(CH_2-CH_2-O-)_m$ $-CH_2-CH_2-$ or $-(Ch_2-CH_2-CH_2-O-)_m$ $-CH_2-CH_2-CH_2-$ or

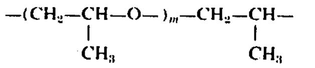

wherein m denotes an integer from 1 to 2.

A second preferred group of cross-linkable polymers Ia according to the invention is a polymer wherein P represents a polymer reduced by y hydroxyl groups which contains vinyl alcohol units, such as polyvinyl alcohol or completely or partly saponified random copolymers of ethylene and vinyl acetate; i.e. P represents a polymer which contains y recurring units of the general formula

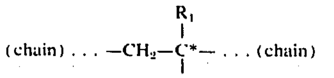
IV wherein the urethane group is attached to C* and $R_1$ and y have the same meanings as in the previous formula III.

As already mentioned, the above-cited polymers according to the invention may in addition to units of general formulae III or IV contain other units which are derived from the additionally incorporated hydroxy group-free monomers.

Preparation of the cross-linkable polymers by the process of the invention is preferably carried out as follows. The vinyl or vinylidene monomer which contains hydroxyl groups is first polymerized in a known manner in an inert solvent, either alone or in combination with other vinyl or vinylidene monomers which may be present in amounts of up to 94 percent by weight. The polymer solution obtained is cooled to room temperature with exclusion of moisture but in the presence of atmospheric oxygen and mixed with an amount of isocyanate-group containing vinyl or vinylidene monomer such that the molar quantity of the isocyanate does not exceed the hydroxyl group content in the polymer. The degree of reaction between the hydroxyl groups and the osocyanate-containing vinyl or vinylidene compounds may be determined by the reduction of isocyanate absorption at 2275 – 2250 $cm^{-1}$ in the infra red spectrum of the reaction mixture (K. Nakanishi, Infra red Absorption Spectroscopy, Holden-Day, Inc., San Francisco (1961) page 28). The reaction is usually completed within a few days even without the addition of catalysts such as tertiary amines, although the addition of less than 1 percent of triethylamine can reduce the reaction time to a few hours.

After completion of the reaction, the crosslinkable urethane group-containing polymer may be used for the production of very high quality copying layers. The polymer may be applied as a radiation-sensitive composition comprising the polymer of the invention and an initiator effective to initiate cross-linking of the polymer on exposure to radiation. For this purpose, the solution may be sensitized with 0.1 to 10 percent by weight of the usual photoinitiators such as benzoin, benzoin ethers, hydroxymethyl benzoin or anthraquinone derivatives such as halogenated or alkyl substituted anthraquinones.

Such layers are free from tackiness and do not show any friability in the presence of atmospheric oxygen. It may be advantageous to improve the stability in storage in known manner by adding thermal inhibitors such as phenol derivatives or hydroquinone derivatives and/or stabilizers such as copper salts. Other solvents, plasticizers, levelling agents, dyes or other fillers which are non-absorbent or only slightly absorbent in the spectral region of the light which initiates photopolymerization, as well as inert polymers, may also be added. It may also be advantageous to add other monofunctional or polyfunctional vinyl or vinylidene compounds to the coating materials. The solution is applied to the desired layer supports by immersion, spraying, casting, rolling, centrifuging or any of the usual application processes, and the coating obtained, which is solid but still soluble in most organic solvents, may be cross-linked by polymerization with the aid of light or other actinic radiation either directly or after it has been transferred to another layer support. It is particularly advantageous to carry out this polymerization with the exclusion of atmospheric oxygen which has an inhibiting effect. This can be achieved by exposing the layer to light The a vacuum or under a protective atmosphere of nitrogen or better still by protecting the light-sensitive layer by a transparent plastics foil applied to it. After the exposed parts of the coating have undergone cross-linking polymerization, the unexposed parts may be dissolved with an organic solvent and washed off. The most suitable solvents for this purpose are those which may also be used for applying the layer. Practically any other solvents in which the polymer is soluble before it has been cross-linked are also suitable. Chlorinated hydrocarbons, higher alcohols, esters and aromatic hydrocarbons may be used for this purpose. the cross-linked insoluble parts of the layer adhere to the layer support and withdstand all the usual etching solutions such as dilute nitric acid and iron-III-chloride solution as well as the deposition of metal in the usual baths.

Suitable layer supports are metal foils of copper, aluminum, zinc, magnesium, steel and the like as well as paper, glass or foils of polymer products such as cellulose esters, polyvinyl acetate, polyphenylolalkanes, polyesters, especially those based on polyethylene terephthalate, and polyamides, e.g. nylon. Materials which have a network structure such as metal mesh may also be used as supports. With suitable choice of polymers, the layers may also be produced as self supporting layers.

Layers of the polymers according to the invention may also be used for the production of relief images or of printing forms for relief printing, photogravure or planographic printing. Offset printing processes, screen printing processes, printing with lithographic printing plates or any other printing processes which require a relief image as well as gravure processes should be especially mentioned. Important applications of the layers according to the invention are the production of printed circuits, the production of etched moldings, the production of moldings by the electroforming process and the production of integrated microswitch circuits.

Exposure of the layers produced according to the invention is carried out with the usual sources of light used for reproduction work, such as carbon arc lamps, Xenon lamps or high pressure mercury lamps, which provide a particularly effective proportion of ultraviolet light for polymerization in addition to visible light.

In what has been said above, the polymers of the invention have been discussed mainly with respect to the process of preparing certain light sensitive copying layers, but it should be understood that the polymers according to the invention may also be used for other coatings which require subsequent cross-linking; they may be used for lacquers and coatings in general.

The cross-linking reaction can be released not only by light. Other high energy radiation such as electron radiation, X-ray radiation and $\gamma$-radiation may also be employed. Furthermore, initiation of the cross-linking reaction may be carried out also by means of the usual polymerization starters used for vinyl polymerizations, such as organic peroxides.

For this wider range of application, the restriction as regards fillers which is necessary for photochemically initiated cross-linking does not apply. In principle, any of the usual pigments and additives used e.g. in unsaturated polyester styrene lacquers may be used.

EXAMPLE 1

Preparation of the polymer:

400 ml. of tertiary butanol were heated under reflux under nitrogen in a 2-litre three-necked flask equipped with stirrer, reflux condenser and dropping funnel. A mixture of 288 g. of propyl methacrylate, 150 g. of methyl methacrylate, 150 g. of methyl acrylate, 100 g. of tertiary butanol and 1.5 g. of benzoyl peroxide was added dropwise in the course of 5 hours. When all the mixture had been added, another 0.5 g. of benzoyl peroxide in tertiary butanol was added and the mixture was kept under reflux for 4 hours. After removal of the tertiary butanol by evaporation, which was carried out partly under vacuum, the polymer was freed from residual solvent by drying in a vacuum drying cupboard at 15 mm Hg/50°C. 580 g. of a colourless solid resin were obtained.

480 g. of the polymer were dissolved in methylene chloride to prepare a solution having a concentration of 30 percent by weight, and 194 g. of isocyanatoethyl methacrylate were added to the solution at room temperature with stirring in the course of 30 minutes. The mixture was then kept at room temperature for another 48 hours.

Light sensitive material:

The solution prepared as described above was sensitized with 3 percent by weight, based on the dry film-forming polymer, of 2-chloromethyl-anthraquinone and coloured by the addition of 0,5 percent by weight of Sudan Blue. This solution was used for coating an aluminium foil by means of a whirler and the coating was dried in the usual manner. The light sensitive layer had a thickness of 28 to 30 $\mu$ after drying. It was then laminated with a polyethylene foil 30 $\mu$ in thickness to protect it against atmospheric oxygen which acts as a polymerization inhibitor.

Processing:

The material described above was exposed through an original for 4 minutes in an exposure apparatus made by the firm Chem-Cut. This exposure corresponds approximately to 2 minutes exposure to a carbon arc lamp (42 Volt, 30 Amp.) at a distance of 45 cm. After removal of the protective foil, the layer may be developed in a mixture of ethyl acetate and trichloroethylene. A sharp positive relief of the original is obtained.

EXAMPLE 2

Preparation of the polymer:

In a manner analogous to that described in Example 1, a mixture of 95 g. of hydroxypropylmethacrylate, 100 g. of methyl methacrylate, 42.2 g of butyl acrylate, 100 g. of methyl ethyl ketone and 3 g. of azoisobutyric acid dinitrile was added dropwise in the course of 6 hours to 800 ml. of methyl ethyl ketone boiling under reflux. After a further addition of 1 g. of azoisobutyric acid dinitrile, the reaction mixture was again heated under reflux for 5 hours. 500 g. of the polymer solution were concentrated to 260 g. by removal of the solvent by distillation, and 45 g. of isocyanatoethylmethacrylate were added at room temperature in the course of 30 minutes with stirring.

Light sensitive material:

After 48 hours at room temperature, the polymer solution was sensitized with 3.5 percent by weight of 2-tertiary butylanthraquinone, based on the dry film-forming polymer. This solution was used for coating a 30 $\mu$ polyester foil and the coating was then transferred to a thin copper foil by means of laminating rollers at 120°C. The thickness of the layer of pure photopolymer was 35 $\mu$.

Processing:

The material described above was exposed through the polyester foil in a Chem-Cut exposure apparatus through a 0.15 grey step wedge for 4 minutes.

This exposure corresponds approximately to 2 minutes exposure to a carbon arc lamp (42 Volt, 30 Amp.) at a distance of 45 cm. After removal of the protective foil, the layer may be developed in a mixture of ethyl acetate and i-propanol. A sharp positive relief image of the original is produced which has a gradation of 12 steps.

EXAMPLE 3

The solution of urethane polymer in methylene chloride obtained in Example 1 was applied to a metal surface as a layer 150 μ in thickness and after evaporation of the solvent it was exposed to Mrad of electron radiation of energy 320 KeV and current intensity 40 mA under an electron accelerator in a nitrogen atmosphere (Model: ESTRA Experimental Station of Werner & Pfleiderer/BBC). At the end of this treatment, a cross-linked, insoluble film was obtained which did not undergo swelling even after one minute's treatment with ethyl acetate.

EXAMPLE 4

2 percent by weight of benzoyl peroxide (based on the solids content) were added to the solution of urethane polymer from Example 2. A coating 200 μ in thickness produced from this solution on a glass plate was covered with a polycarbonate foil 30 μ in thickness after evaporation of the solvent and then stoved at 150°C. for 10 minutes. A hard, insoluble coating was obtained.

EXAMPLE 5

After removal of the protective polyethylene foil, a sample of the material prepared according to Example 1 was exposed for 4 minutes in a Chem-Cut exposure apparatus which had been repeatedly flushed with nitrogen. The original specimen to which the material was exposed was a 0.15 grey step wedge.

After development in a mixture of ethyl acetate and trichloroethylene, a sharp, positive relief image of the original specimen was obtained with a gradation of 10 wedge steps.

EXAMPLE 6

A sample of the material prepared according to Example 2 was exposed for 4 minutes through an original in an exposure apparatus which had been repeatedly flushed with nitrogen, and the sample was then developed in a mixture of i-propanol and ethyl acetate. The resulting sharp positive relief image of the original specimen could be transferred when dry to a copper-Pertinax foil by means of laminating rollers heated to 120°C.

EXAMPLE 7

42.4 parts by weight of a saturated polyester based on phthalic acid and trimethylolpropane having an acid number of 3 and an OH number of 263 (viscosity 50 percent by weight in ethyl glycol acetate at 20°C: 850 cP) were dissolved in 100 parts by weight of ethyl acetate, 0.5 parts by weight of triethylamine were added, and the solution was mixed with 31 parts by weight of isocyanatoethylmethyacrylate at room temperature with stirring. After 2 days at room temperature, the polyester solution was made up into a light sensitive layer by a method analogous to that of Example 2 and exposed to light. A sharp positive relief image was again obtained.

What we claim is:

1. An organic homopolymer or random copolymer having a number average molecular weight, determined by the osmometric method, of greater than 1,000 which contains per molecule y recurring units of the formula

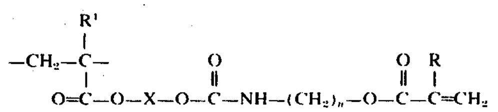

wherein

R and R¹ are hydrogen or alkyl having 1 to 4 carbon atoms, n is an integer from 1 to 6, y is an integer from 2 to 500 and X is an alkylene group having 1 to 9 carbon atoms or an alkylene group having 2 to 9 carbon atoms interrupted by from one to two -O- groups.

* * * * *